United States Patent

Bolger

[11] Patent Number: 5,560,272
[45] Date of Patent: Oct. 1, 1996

[54] IMPROVEMENTS IN QUICK-CHANGE TOOL POSTS

[76] Inventor: Joseph E. Bolger, 28 Summer St., Barre, Mass. 01005

[21] Appl. No.: 496,968

[22] Filed: Jun. 30, 1995

[51] Int. Cl.$^6$ ................................................. B23B 29/24
[52] U.S. Cl. .......................... 82/160; 81/119; 81/177.1; 82/161
[58] Field of Search ........................... 82/158, 159, 157, 82/160, 161; 81/119, 176.2, 177.1

[56] References Cited

U.S. PATENT DOCUMENTS

| | | | |
|---|---|---|---|
| 324,104 | 8/1885 | Goodson | 81/119 |
| 2,770,993 | 11/1956 | Olson | 82/159 |
| 2,908,195 | 10/1959 | Benes | 82/159 |
| 3,088,351 | 5/1960 | Schardt | 82/159 |
| 3,434,377 | 3/1969 | Stone | 82/161 |
| 5,214,989 | 6/1993 | Giannetti | 82/160 X |

FOREIGN PATENT DOCUMENTS

| 1154267 | 4/1958 | France | 82/159 |
|---|---|---|---|

*Primary Examiner*—Daniel W. Howell
*Assistant Examiner*—Henry Tsai
*Attorney, Agent, or Firm*—Ross, Ross & Flavin

[57] ABSTRACT

A retrofit assembly for a tool post adapted for rapid attachment and detachment relative to the compound rest of a lathe for adjusting the positioning thereof and for the presentation of a tool holder relative to the tool post consisting of a single operating body for tightening/loosening the tool post relative to the compound responsively to the turning of a stud on a screw means and for tightening/loosening a tool holder relative to the tool post responsively to the driving force of a manipulating device.

3 Claims, 3 Drawing Sheets

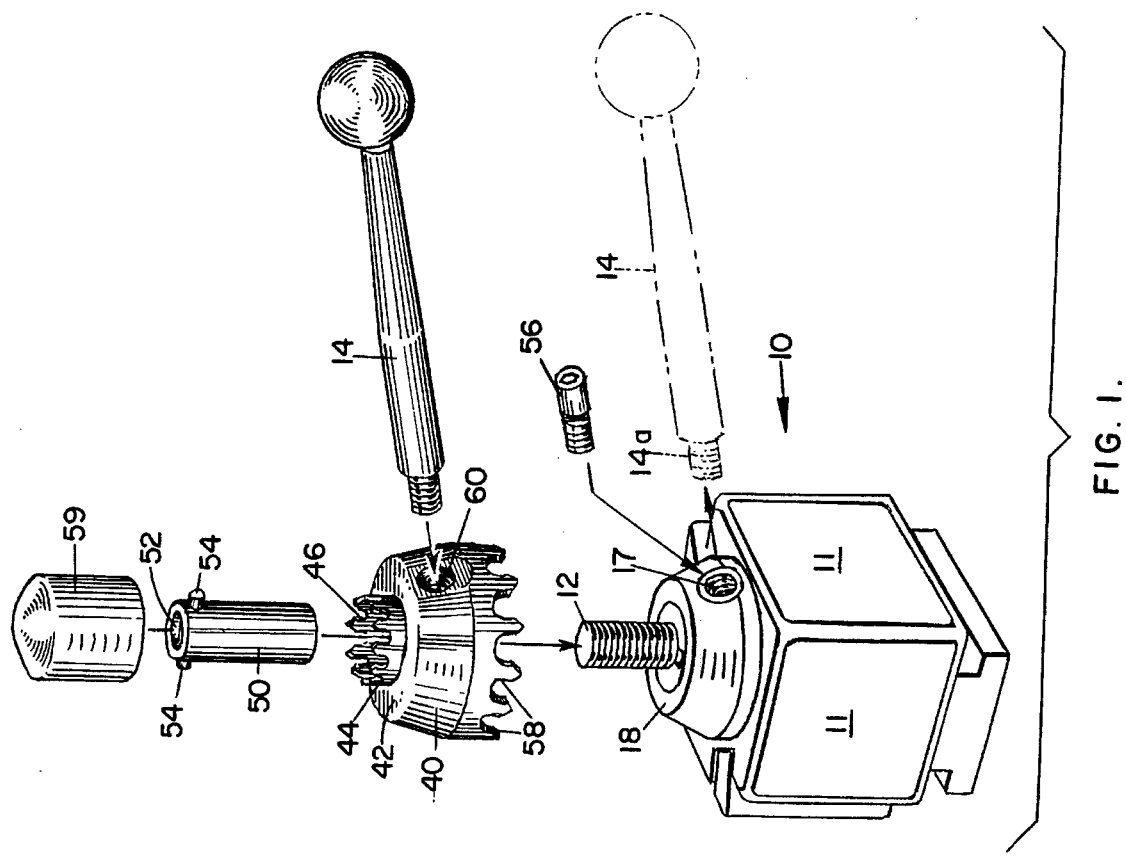
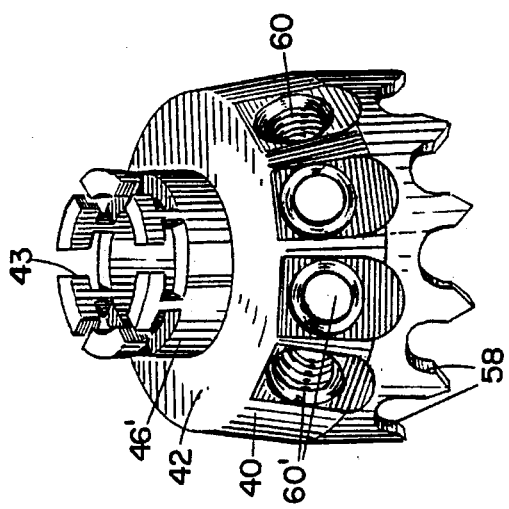

IMPROVEMENTS IN QUICK-CHANGE TOOL POSTS

BACKGROUND OF THE INVENTION

1. Field of the Invention

In the conventional tool post, mounted on a compound rest of a lathe or similar machine, and designed for the quick and easy interchanging of forming tools for specific machining operations, it is normal to find a screw means for drawing the tool post into and out of firm engagement with the lathe and a separate handle means for drawing the tool holder into and out of locked engagement relative to the tool post.

As is common, a wrench is brought into play for adjusting the screw means whereas, of course, the handle means, a traditional component of the tool post mechanism, is brought into play for adjusting the tool holder.

And as is so often the case, at the moment of adjusting the tool post, a suitable wrench is inevitably not to be found, meaning down time whilst the requisite accessory is located, and brought to the situs, for the manipulation desired.

In this invention is taught a retrofit subassembly, easily adaptable as a modification of an existing tool post, not only for the adjusting of the tool post relative to the machine, but also for simplifying the locking/unlocking program of the tool holder with respect to the tool post.

The matters of adjusting the tool post to a desired or indexed position relative to the compound and of adjusting the tools relative to the work represent valuable and costly time, and this invention aims to conserve that time.

The tool post retrofit will facilitate the quick and accurate adjusting and setting of the tool post relative to the equipment on which it is used and of the tools as supported by such tool post.

2. Description of the Prior Art

The tool post constitutes one of the basic accessories of a conventional lathe, screw machine or the like and is adapted to be properly positioned and held secure with respect to the equipment being accommodated and serves for the proper mounting of a cutting or forming tool relative to the work piece being machined.

Such a two-step adjustment program, first, adjusting the tool post properly and clamping it securely relative to the equipment and, second, adjusting the forming tool and clamping it securely to the tool post, has consistently necessitated two separate procedures, separate mechanisms being involved for their accomplishment.

Typically, the need for such two step program is exemplified in the patent to E. F. Gourley, U.S. Pat. No. 3,572,195 of Mar. 23, 1971, wherein the strategic adjustment of a nut 6 at the top of a center bolt 2, by the application of a wrench to that nut, accomplishes the clamping of the tool post to the lathe bed or other equipment. In the course of the loosening of the tool post, it will be appreciated that the tool post may be rotated about the vertical axis of the center bolt to the end of selectively positioning and then clamping the tool post to the equipment thereat.

The turning of the nut by the wrench, controls the clamping and releasing positions of the tool post on the machine.

With further reference to the patent, a dovetail-shaped tenon 21 extends outwardly from one of the vertical faces of the tool post to permit the selective mounting of a tool holder H which receives a tool T by means of clamping bolts 17, the tool being a cutting bit, boring tool, knurling tool, cut-off tool, or whatever, for use against the workpiece.

The system alternately releases tool holder H from clamping engagement with the tool post or clamps the tool holder tightly thereto, all through the rotation of operating handle M, such rotation enforcing a rectilinear movement of a clamping member relative to the tenon in which the tool holder is seated.

SUMMARY OF THE INVENTION

The primary thrust of the invention lies in the "one handle-two function" characteristic of the retrofit subassembly which admirably fits the claim for a "Quick Change Tool Post".

In the herein described versions of the modification, a single operating handle is exploited for serving the two purposes of the conventional tool post.

Advantageously, the handle provided with the tool post being modified can be easily brought into play as a component of the retrofit-subassembly.

As indicated earlier, the tool post commonly comprises a block for supporting a tool or tools. The block is rotatable relative to a spindle or center bolt, the spindle or center bolt having means cooperating with means on the lathe or other equipment for clamping the block in any one of a number of positions along a horizontal plane with reference to the accommodated equipment, the spindle or center bolt defining the engaging or disengaging locking means in the form of a head on the spindle or center bolt engageable in a T-slot in the compound, or in the form of interengaging teeth on the block and the lathe, or any similar engageable/disengageable locking system for rotating and holding the tool post stationarily relative to the equipment.

A first device is usually in the form of a nut at the top of the block and in threaded engagement with the vertically-extending center bolt. The rotary movement of the wrench results in a translating movement on a bushing circumscribing the center bolt and seated on the bottom of a cavity in the tool post so as to effect a tightening or a releasing of the clamping mechanism, i.e. the bottommost head of the center bolt against a wall of the T slot of the equipment.

By the loosening of the tool post relative to the lathe or other equipment, adjustment of the tool post to any other desired locating position relative to the equipment is obtained.

A second adjusting device, separate from the first device, serves to allow the changing of the tool holder which carries a selected one of the forming tools.

The tool post is usually square in horizontal cross-section so as to define four vertically-disposed faces, in at least one of which is provided an outwardly-facing dovetail-shaped tenon.

The second adjusting device serves to clamp a tool holder within the tenon and its clamping system is controlled by the conventional handle on the tool post.

BRIEF DESCRIPTION OF THE DRAWINGS

FIG. 1 is an exploded isometric projection of the components of the retrofit assembly of the invention shown in association with a typical commercially-available tool post;

FIG. 2 is an enlarged view in perspective of the modified cap component of the retrofit assembly;

DESCRIPTION OF THE PREFERRED EMBODIMENTS

Figure 3:
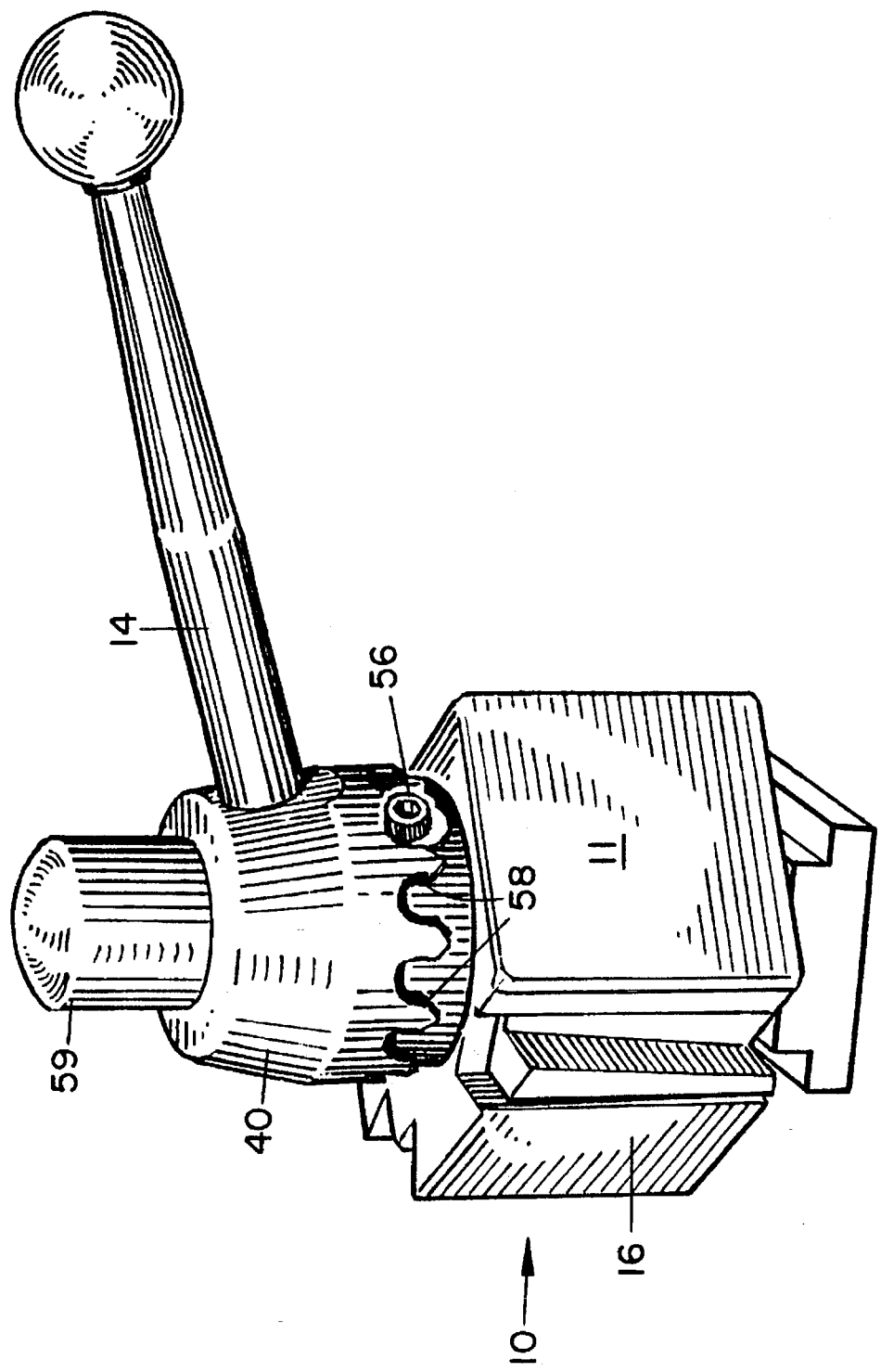
FIG. 3 is a view in perspective of the retrofit assembly in association with a commercial tool post with the assembly in the lower tool holder adjusting position.

In FIGS. 1 and 3, I have shown a typical commercially-available tool post 10 with the usual vertically-extending center bolt 12 projecting upwardly through the tool post center and with a handle 14 (shown in FIG. 1 in phantom as a component part of the regularly available tool post and in solid lines as a component part of the retrofit assembly of the invention) having a threaded inboard terminus 14a in engagement with a complementally-threaded opening 17 in a tool post sleeve 18.

As best shown in FIG. 3, at least one of the side faces 11 of tool post 10 is provided with a dovetail-shaped tenon 16 for the :mounting of a tool holder, not shown, there being a typical internal clamping or camming mechanism, normally operable by handle 14, for the clamping of the tool holder to the tenon, with tool (also not shown) being in turn mounted on the tool holder.

The retrofit assembly of the invention includes a cylindrical cap 40 nestably receivable over sleeve 18, there being a central opening through the cap's topmost surface 42 for acceptance therethrough of center bolt 12.

A vertical upwardly projecting annular ring 44 is fixed to cap 40 circumadjacent the central opening and has its upper peripheral rim defining a toothed ratchet wheel 46.

A cylindrical bushing 50 is receivable through the cap opening to seat on the top of sleeve 18, and is internally threaded for engagement with threaded center bolt 12.

Bushing 50 accommodates a horizontally-disposed pin 52 extending diametrically therethrough to define slightly outboard thereof at each terminus a pawl 54, the pawls being receivable in a pair of diametrically opposite ratchets of ratchet wheel 46 for the ratcheting of threaded bushing 50 on center bolt 12 by the rotating of handle 14. By means of such, a fine feed can be obtained with the ratchet wheel hereof.

A pawl 56 is a provided component of the retrofit assembly, being threadedly engaged in sleeve opening 17, once handle 14 has been removed therefrom in the retrofitting program, for purposes to appear.

A cover 59 may be provided as another retrofit component, same being sleevable over bushing 50 and nestably received as a snug fit over ring 40.

The lower peripheral rim of cap 40 is configured to define a toothed ratchet wheel 58, the teeth of which wheel may be selectively engaged with pawl 56 as handle 14 is used to effect cap rotation along a horizontal plane.

Handle 14 of the commercial tool post unit, as aforesaid, normally functions as the operating mechanism for the locking or unlocking of tool holder relative to tool post. As explained, the handle is disengaged from its normal position of threaded engagement in opening 17 and is now received in the threaded opening 60 in cap 40.

Not only is cap 40 rotatable, but also it may be lifted vertically upwardly, merely by a lifting motion on handle 14, for the entry of pawls 54 in a pair of the diametrically opposite ratchets 46 whereby cap 40 and bushing 50 may be rotated to effect the loosening or tightening of the tool post relative to the lathe.

Advantageously, by this arrangement, handle 14, supported as it is from cap 40 and being in a neutral position of disengagement from either ratchet wheel is now swingable or rotatable into any desired position relative to the tool post and to the lathe, all so as to move clear of the operator's way in his work progress.

If desired, ring 44 of FIG. 1 may be replaced by the arrangement of FIG. 2 wherein a ring 46', fixed atop the upper cap surface 42, is provided with a plurality of upwardly facing diametrically-opposed pairs of bayonet slots 43. Each such slot is defined by an inwardly-extending vertical slot communicating with a pair of inner oppositely-facing horizontal slots.

The function of the pairs of bayonet slots is, upon the shifting of the handle to its first or upper position, to receive the opposite pins 54 first into the vertical slots of the diametrically-opposite bayonet slots and second in one of the other of the horizontal slots of the respective bayonet slots, responsive to the rotating of the cap by the operator through handle 14. Handle and cap are held in this upper position until release is affected by the rotating of the handle slightly so as to allow pins 54 to align with the vertical slots, thus permitting the cap and handle to drop to its second or lower operating position.

As shown only in FIG. 2, series of openings 60' circumferentially arranged around the perimeter of cap may be provided each with a different thread to accommodate to the different threads encountered with the operating handles 14 of tool posts of different manufacturers.

Figure 4:
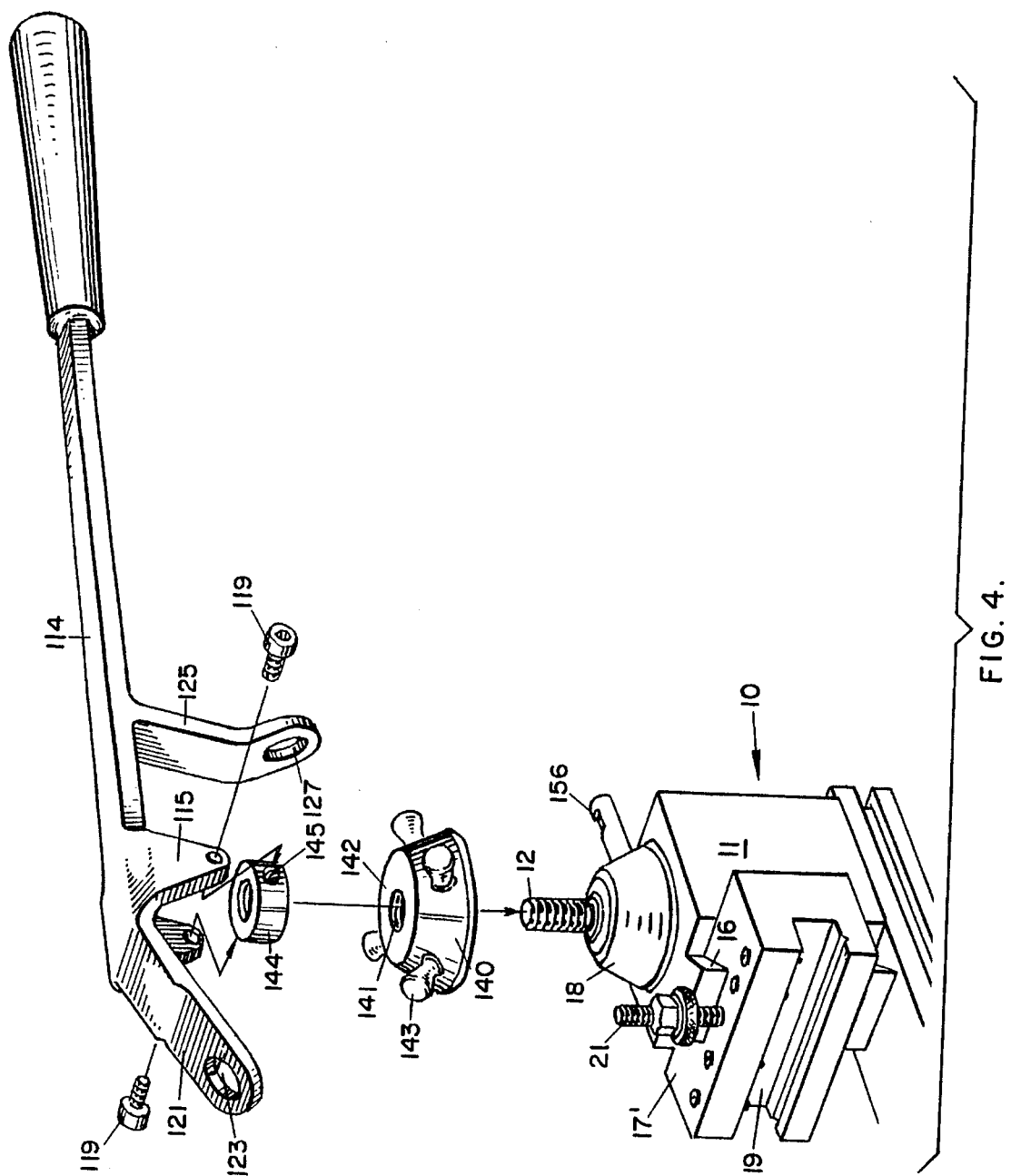
FIG. 4 is an exploded isometric projection of the components of a second version of a retrofit assembly in association with a typical tool post.

In FIG. 4, I have disclosed a second form of a retrofit assembly, again with the dual purpose in mind of an easy clamping or releasing of tool post relative to lathe and a quick clamping or releasing of tool holder relative to tool post. As in the case of the FIGS. 1, 2 and 3 versions, the need for a separate wrench or equivalent tool is obviated.

Here again a commercially-available tool post 10, with center bolt 12 projecting upwardly through a sleeve 18 is ready for modification, the usual handle having been removed and replaced by a pawl 156 of the retrofit assembly.

In this case, I have shown a side face 11 of tool post 10 with the usual dove-tail-shaped tenon 16 for the mounting of a tool holder 17', there being a typical internal clamping or camming mechanism, normally operable by the handle, for securing a tool holder to the tenon. A tool (not shown) is receivable in a tool recess 19 in the tool holder, the tool being secured in operating position by the adjusting of a screw 21.

The retrofit assembly envisions a cylindrical cap 140 sleeveable over tool post having a threaded central through opening 141 for threaded acceptance therethrough of center bolt 12 of the tool post to be modernized.

Cap 140 is provided with a plurality of equispaced diametrically-opposed outwardly-projecting driveable teeth or pawls 143.

A vertically-projecting annular ring 144 threaded on center bolt 12 seats securely on cap 140 circumadjacent central opening 141 and is provided with a pair of diametrically-arranged through openings 145.

A handle 114 serves as a transmission shifting lever in the respect that it is the means by which power is transmitted from the handle to either the system for clamping or unclamping tool post to lathe or the system for clamping or unclamping tool holder to tool post.

Handle 114 has a pair of opposite depending lugs 115, each having a through opening for the receipt of bolting 119 whereby handle 114 is held in pivotal engagement with ring 144 for horizontal and/or vertical swinging movements of the handle relative to cap 140.

Handle 114 will be normally disposed in a horizontally-swingable or rotatable "neutral" position.

Outboard of the handle pivot, the outboard terminus of handle 114 defines an angularized cap-engaging portion 121 having a through opening 123 for the receipt of one of the cap pawls 143 when the clamping or unclamping of tool post to lathe is desired. That is, when handle 114 is shifted angularly upwardly from a neutral position to its position where the engagement of handle opening 123 over one of the driveable teeth or pawls 143 is attained.

Inboard of the handle pivot, a pawl engaging leg 125, integral with and depending from handle 114, has a pawl engaging through opening 127.

Operationally the handle may be selectively shifted angularly upwardly to a first or "high" position whereat angularized portion 121 depends farther downwardly or lowered angularly downwardly to a second or "low" position whereat depending leg 125 depends farther downwardly.

In this manner, drive trains are established for the intermittent driving of the two outputs along different mechanical drive paths.

Operationally, handle 114 is shifted angularly downwardly from neutral to a position of engagement of opening 127 over Pawl 156.

Handle 114 is shiftable from a central, neutral position and a so-called "low" position of angularity where leg 121 is inclined downwardly or a so-called "high" position of angularity where leg 125 is inclined downwardly.

By angularizing of handle 114 on its pivot at bolts 119, the handle may be engaged with pawls 143 for effecting the rotation of cap 140 and thus the locking/unlocking of the tool post relative to the lathe. A further angularizing of the handle may attain an engagement with pawl 156 for effecting the clamping/unclamping of the tool holder relative to the tool post.

Having described only typical preferred forms and applications of my invention, I do not wish to be limited or restricted to the specific details herein set forth, but wish to reserve to myself any modifications or variations that may appear to those skilled in the art and which fall within the scope of the following claims.

I claim:

1. In a tool post lathe accessory having a first adjusting means in the form of a vertically-disposed threaded spindle driven rotatively by an auxiliary tool in the drawing of the tool post into and out of locked interengagement with the lathe and a second adjusting means in the form of a clamping device driven by the rotative motion of a horizontally-rotatable sleeve manipulated by a handle in threaded engagement with the sleeve through a threaded sleeve opening for the swinging of the handle in the drawing of a tool holder and supported tool into and out of clamped engagement with the tool post, the improvement in a retrofit assembly consisting of an apertured cylindrical cap nestably receivable over the sleeve and spindle and having a threaded cap opening for the threaded engagement of the handle for imparting rotative motion to the cap, an annular ratchet ring fixed to the upper surface of the cap, an internally threaded cylindrical bushing seating on the sleeve and circumscribing and threadedly engageable with the spindle, a pin extendable diametrically through and outwardly of the bushing in defining a pair of pawls receivable in a pair of diametrically opposite ratchets of the ratchet ring, a threaded sleeve pawl being received in the threaded sleeve opening and extendable radially outwardly therefrom, the lower peripheral rim of the cylindrical cap being provided with a series of lower ratchets for the reception of the sleeve pawl in one of the ratchets and imparting horizontal rotative movement to the sleeve, all adapted and arranged whereby the handle may serve through the lower ratchet to lock or unlock the tool holder relative to the tool post merely by the movement of the handle through a horizontal plane and alternately by the lifting of the tool handle vertically upwardly for the entry of the pawls into the ratchet ring for effecting rotation of the cap and bushing and the resultant loosening or tightening of the tool post relative to the lathe.

2. In a tool post lathe accessory having a first adjusting means in the form of a vertically-disposed threaded spindle driven rotatively by an auxiliary tool in the drawing of the tool post into and out of locked interengagement with the lathe and a second adjusting means in the form of a clamping device driven by the rotative motion of a horizontally-rotatable sleeve manipulated by a handle in threaded engagement with the sleeve through a threaded sleeve opening for the swinging of the handle in the drawing of a tool holder and supported tool into and out of clamped engagement with the tool post, the improvement in a retrofit assembly consisting of an apertured cylindrical cap nestably receivable over the sleeve and spindle and having a threaded cap opening for the threaded engagement of the handle for imparting rotative motion to the cap, an annular bayonet slotted ring fixed to the upper surface of the cap, an internally threaded cylindrical bushing seating on the sleeve and circumscribing and threadedly engageable with the spindle, a pin extendable diametrically through and outwardly of the bushing in defining a pair of pawls receivable in a pair of diametrically opposite bayonet slots of the bayonet slotted ring, a sleeve pawl being received in the threaded sleeve opening and extendable radially outwardly therefrom, the lower peripheral rim of the cylindrical cap being provided with a series of lower ratchets for the reception of the sleeve pawl in one of the ratchets and imparting horizontal rotative movement to the sleeve, all adapted and arranged whereby the handle may serve through the lower ratchet to lock or unlock the tool holder relative to the tool post merely by the movement of the handle through a horizontal plane, and alternately by the lifting of the tool handle vertically upwardly for the entry of the pawls into the bayonet slots for effecting rotation of the cap and bushing and the resultant loosening or tightening of the tool post relative to the lathe.

3. In a tool post lathe accessory having a first adjusting means in the form of a vertically-disposed threaded spindle driven rotatively by an auxiliary tool in the drawing of the tool post into and out of locked interengagement with the lathe and a second adjusting means in the form of a clamping device driven by the rotative motion of a horizontally-rotatable sleeve manipulated by a handle in threaded engagement with the sleeve through a threaded sleeve opening for the swinging of the handle in the drawing of a tool holder and supported tool into and out of clamped engagement with the tool post, the improvement in a retrofit assembly consisting of an apertured cylindrical cap sleeveable over the sleeve and spindle and provided with a series of diametrically opposed-radially outwardly projecting pawls, annular ring secured centrally of and to the upper surface of the cap, a shifting lever pivotally mounted relative to the annular ring for allowing both horizontal and vertical movements relative to the cap, an angularized cap engaging portion of the lever outboard of its pivot having a through opening for the reception of one of the cap pawls for the clamping/unclamping tool post to lathe mode, a depending pawl engaging leg integral with and depending from the lever inboard of its pivot and having a pawl engaging opening for the reception of the pawl for the clamping/unclamping tool holder to tool post mode.

* * * * *